United States Patent [19]

Beckwith

[11] 4,363,974
[45] Dec. 14, 1982

[54] METHOD AND APPARATUS FOR PROVIDING SIGNALS FROM LTC TRANSFORMER TO ELECTRICAL DEVICES

[76] Inventor: Robert W. Beckwith, 5728 Oakhurst Dr., Seminole, Fla. 33542

[21] Appl. No.: 251,377

[22] Filed: Apr. 6, 1981

[51] Int. Cl.³ .................... G05B 13/02; G05B 11/32
[52] U.S. Cl. ........................... 307/40; 364/492
[58] Field of Search .................. 307/11, 31, 38–40; 364/492, 493

[56] References Cited

U.S. PATENT DOCUMENTS

| | | | |
|---|---|---|---|
| 3,906,242 | 9/1975 | Stevenson | 307/38 |
| 4,204,127 | 5/1980 | Carter | 307/39 |
| 4,213,058 | 7/1980 | Townsend | 307/39 X |
| 4,215,276 | 7/1980 | Janeway | 307/40 |
| 4,264,960 | 4/1981 | Gurr | 307/40 X |

Primary Examiner—Donald A. Griffin
Attorney, Agent, or Firm—Leo J. Aubel

[57] ABSTRACT

A method and apparatus for utilizing a load tap changing transformer as a control signal communicator.

12 Claims, 3 Drawing Figures

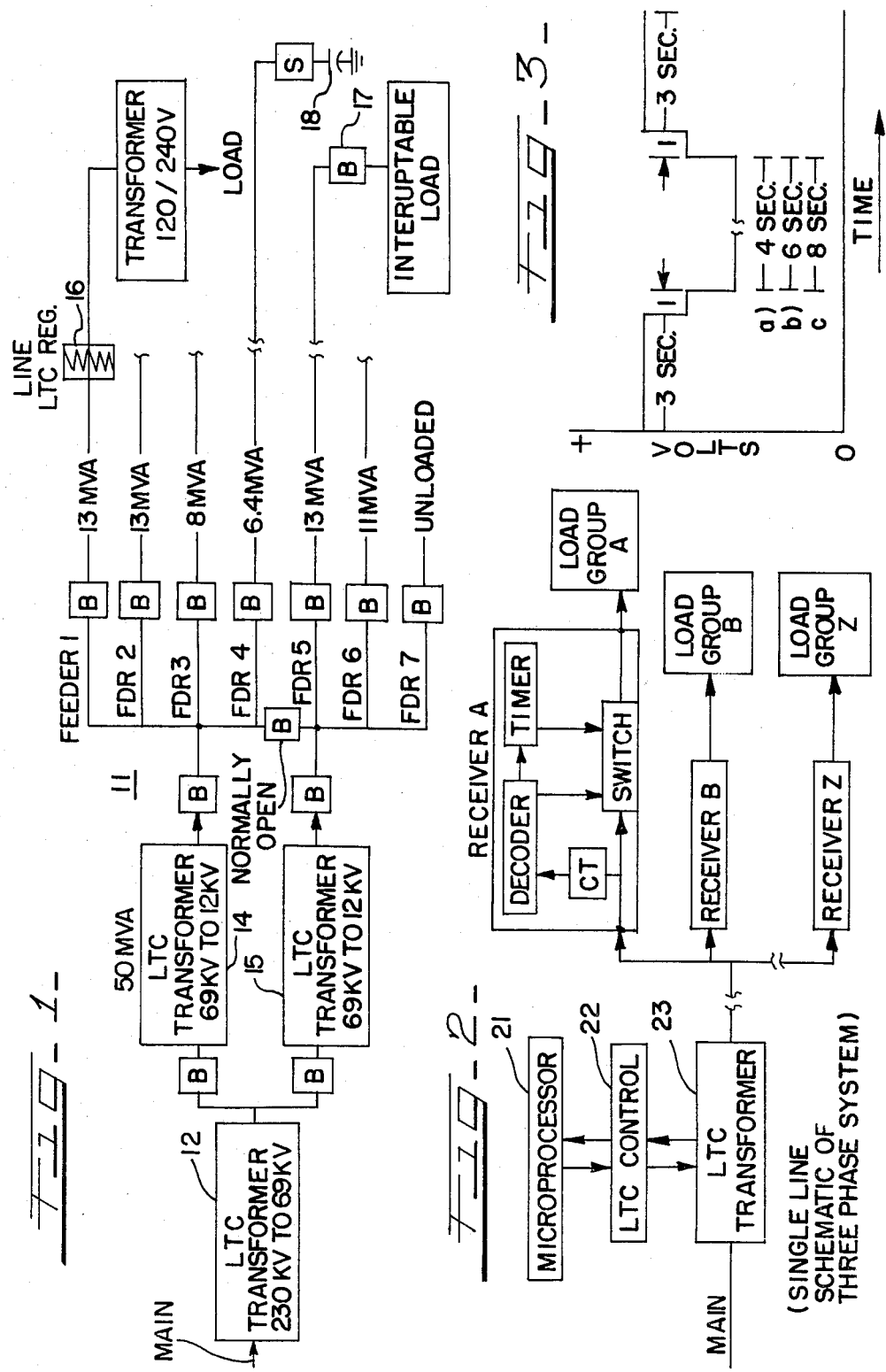

METHOD AND APPARATUS FOR PROVIDING SIGNALS FROM LTC TRANSFORMER TO ELECTRICAL DEVICES

TECHNICAL FIELD

In an electrical power distribution system, the method and means incorporating control systems for an electric power utility distribution system. The invention relates to electrical power load management systems.

BACKGROUND OF THE INVENTION

Electric utility companies have need to control devices on their distribution systems. For example, there is a need to turn off non-critical loads, such as water heaters and air conditioning equipment, during peak load conditions in order to save the relatively high cost of owning and operating peaking units; that is, generators whose purpose is to supply the additional power needed during peak load conditions. The loads to be controlled are owned and located in the customer's plant or home.

It is also desirable to reduce the voltage so as to decrease the power taken by the loads during periods of peak power.

During emergency load conditions, it is sometimes necessary to open circuit breakers and interrupt service beyond the circuit breaker until the emergency situation has ended.

Another use for control circuits is in the connecting and disconnecting of capacitors for the purpose of correcting the power factor of the system. In this application, a problem arises in that the economical place to measure power factor is at the substation; yet the optimum location for the capacitors is at several points along the distribution line feeding residential and industrial loads. The capacitors are typically located atop a utility distribution pole.

An article in the IEE Transactions on Power Apparatus and Systems, Volume PAS-99, No. 4, July/August, 1980, by B. F. Hastings, entitled "Ten Years of Operating Experience with a Remote Controlled Water Heater Load Management System at Detroit Edison" discusses certain background material concerning load management systems. As stated in the article, one early method of load management comprised a time-clock-controlled system for switching water heaters off during peak load periods. Subsequently, this system was changed to provide a radio communication system, which switched the loads in response to radio signals under the control of system operators. As discussed in the article, several other methods of power system control, including carrier telephone circuits and pilot wire, are known. However, as can be readily appreciated, the prior systems had several drawbacks, including the high cost of installing and operating a communication network from the substation to the large number of devices to be controlled.

SUMMARY OF THE INVENTION

The present invention relates to an improved method and means for controlling the load and power factor of a power distribution system, wherein one or more load tap changing (LTC) transformers are controlled to provide distinctive voltage codes which may be recognized by a decoder at various devices to selectively control the devices for most efficient operation, such as under peak load or emergency conditions.

Stated in another way, the invention describes a method and means for use in a power distribution system for controlling a number of devices concurrently by utilizing the operating characteristics of load tap changing (LTC) transformers in a unique and novel way to control the power to selected loads or to start or stop dispersed storage and generating stations located at points remote from the signal-sending LTC transformer.

Load tap changing (LTC) transformers are, of course, well known in the art; also, tap changer controls for such transformers are well known; for example, U.S. Pat. No. 3,721,894, issued to R. W. Beckwith in 1972, is directed to a Regulator Control for an LTC Transformer.

BRIEF DESCRIPTION OF SEVERAL VIEWS OF DRAWINGS

The foregoing features and advantages of the present invention will be apparent from the following more particular description of the invention. The accompanying drawings, listed hereinbelow, are useful in explaining the invention wherein:

FIG. 1 is an electrical block diagram, showing the relative location of various LTC transformers in a portion of a typical electrical power distribution system;

FIG. 2 is an electrical block diagram of the control system in accordance with the invention; and FIG. 3 is a graph, indicating a code pattern such as may be used in the present invention.

DETAILED DESCRIPTION

As is known, load tap changing transformers or regulators automatically adjust to maintain a constant voltage. Commonly, an electrical transmission system is monitored; and any changes outside a given voltage bandwidth are noted, and tap changer controls are provided for causing a change in the electrical contact taps of the associated transformers to regulate or bring the voltage to the desired potential. For example, should the voltage in the system go below a selected potential range for a preset length of time, provision is made to energize a motor to drive the tap selector switches to make contact with a point of higher potential; and, conversely, if the voltage goes above a selected potential range for a preset length of time, the motor is energized to drive the tap selector switches to make contact with a point of lower potential.

In one common configuration (known as sequential operation), the tapchanger will change as quickly as possible, and as many tap changes as necessary, to bring the voltage within the band. In a second common configuration (known as non-sequential operation), a timed delay is used between each tap change, regardless of whether or not the voltage is within bandwidth limits.

In the operation of an LTC transformer, if the required tap change results from a gradual voltage change due to build-up or decay of load, only a single tap change is normally needed; however, if the tap change results from a major system disturbance, several tap changes may be required to correct the voltage; and the difference between sequential and non-sequential operation becomes apparent. Note that a timed delay may be added in the control circuitry so that, even in the sequential configuration, the tapchanger will have a desired minimum time between tap changes.

FIG. 1 shows a portion of a typical distribution system 11 that feeds a customer's plant or home. A first transformer 12, transforms from 230 KV, the major transmission voltage, down to 69 KV. The transformer 12 feeds two separate distribution substations, each comprising a 50 MVA (megavolt amp) transformer, labeled 14 and 15, which transform the 69 KV to 12 KV. Conventional circuit breakers in the system are generally labeled B in FIG. 1. Transformer 14 feeds 4 feeders; and transformer 15 feeds 3 feeders. Transformers 12, 14 and 15 are all voltage tap changers. Signals sent from transformer 12 would reach the entire system 11; and, if signals were sent from one of the transformers 14 or 15, the signals would reach a more limited area. Accordingly, there is a choice as to how large an area is to be controlled.

Note that, if transformer 12 is located remotely from transformers 14 and 15, the signals from transformer 12 can change the voltage at point of transformers 14 and 15, as well as of conventional line LTC regulator 16.

All the tap changer transformers operate in the same manner to conform to ANSI Standard C 57.12.30, and have the same percentage of voltage change, so a signal can be sent by any of the transformers 12, 14 or 15.

In another type of substation, the transformers are all connected in parallel; and the transformers carry all 7 feeders. If something happens to one transformer, the other transformers can carry the load. There are also other commonly used paralleling schemes. Accordingly, in these paralleling schemes, it is necessary to control the tap changing of the transformers simultaneously.

In a third type of substation, there are one or two fixed 69 to 12 KVA transformers. Each of the seven outgoing lines would have a single phase regulator on each phase. By controlling the three regulators and changing all three phases, the signals can be sent just to a particular distribution line, not to the others. This latter type provides individual control of each feeder; but it is more expensive.

It should be understood that the present invention is universally applicable for use with various types of systems, as described above: that is, it is applicable in all systems where tap changing transformers are utilized.

As mentioned above, present voltage control or load management schemes involve either radio, power line carrier, or a combination thereof, for switching non-critical loads ON and OFF so as to limit peak demands. The present invention utilizes the load tapchanging (LTC) transformers (which already exist at a substation feeding a distribution system) as a high power, secure communication system. The invention provides a sophisticated voltage control that responds, via a communications link, to load management controls from a central load management computer. Thus, an LTC transformer, together with intelligent voltage receivers at the control devices, eliminates the need for a separate communications channel to each controlled load device.

The inventive method comprises various steps, which will now be described.

It will be appreciated at the outset that the inventive means and method will provide coded turn-ON signals, as well as the turn-OFF signals. In one embodiment, the LTC transformer was used to provide only turn-OFF signals; and a timer control was found quite satisfactory to turn ON the devices after they had been turned OFF. Note that a signal-decoding receiver is provided for the controlled devices (see FIG. 2).

Initially, a control signal is generated, dependent on any desired factors, such as peak loads, time-period, emergency conditions, etc. Next, a load-shedding "signal" is generated by the load tapchanging transformer, with its associated control; and, in one embodiment, comprises, first, a reduction in voltage of two tap positions in a period of one second; and, after a selective time interval, a second restoration to the original tap position in a period of one second. The downward or upward changing of the LTC mechanism is to be sequential, with no time delay between steps. FIG. 3 gives a set of three such signals, having respective time intervals of 4 seconds, 6 seconds and 8 seconds, and which selectively switch three sets of loads on the distribution circuit fed by the particular LTC transformer. Thus, the signals in FIG. 3 provide a time interval detection, with each time interval being arranged to select a particular group or set of load devices. In the normal function of the LTC transformer circuitry, a minimum time delay of three or four seconds is provided between tap changes, so that normal operation is distinct from the "signal" operation, described above and shown in FIG. 3.

As can be readily appreciated, a variety of codes may be used, wherein the number of tap changes, the direction of the voltage change, the time between the tap changes, and/or the multiplicity of tap changes, are variables. The example codes and timing intervals recited should therefore not be considered limiting. Further, as mentioned above, one code could be a turn-OFF signal and another code a turn-ON signal. One limitation or requirement in any code used is that the voltage must be held within safe limits (typically $\pm 5\%$) to power customers' equipment. Note, also, that tap changer maintenance is reduced when using codes requiring a minimum number of tap changes.

The receiver senses voltage continuously between two leads, and responsively switches control or load current between two other leads, one of which may be common with one of the sensing leads. The device senses and decodes the expected number of downward steps, that is, two steps no more than two seconds apart. It then waits a particular time interval (seven seconds), corresponding to one particular group or set of loads. The receiver then looks for a return of the same number of upward steps, that is, two steps no more than two seconds apart. If the expected sequence for a particular load group or set is detected, then that load group is opened for a period, after which the load group will be reconnected, with no further signalling. Preferably, this period will be different for each load to avoid the undesirable effect of all loads reconnecting at the same time. Furthermore, it is desirable to have the time variable at each load, so that, statistically, each load will be off for the same average time. Preferably, the time could be caused to vary randomly between two limits by use of a solid-state random-number generator. Alternatively, a set of variable times could be included in the program of a microprocessor controller.

A central computer will initiate switching one load group or set, and then another, as the system load builds up. Either a particular order is selected for switching the load groups; or the loads can be switched randomly.

"Noise", in this system, will exist in terms of the voltage changes which occur by switching ON and OFF of loads in their normal operations. Load variation, such as the starting of motors, will cause voltage variations, which could be mistaken for control voltage variation. At the signal receiver for each load group, a detection scheme provides a computation of a running cross-correlation between a stored noise-free record of the expected signal or signals and the voltage at a load point. The correlation function will range from −1 for a noise-free mirror image signal to +1 for a noise-free expected signal. At some threshold (+0.5), it can be assumed that the signal is present. Use of the received signal to switch off a load during a peak load period is an example of one use for the general method.

It is standard in the industry to have the voltage change for one tap change equal ⅝%, or ¾ volt. The standard signal stored in the receiver for signal "a" is comprised of one sample per cycle at 60 HZ giving:
180 samples at 120.0 volts, followed by
60 samples at 119.25 volts, followed by
240 samples at 118.5 volts, followed by
60 samples at 119.25 volts, followed by
180 samples at 120.0 volts.

As is known, the cross-correlation function is defined as $$\rho = \frac{\sum_{1}^{n} Xa \cdot Ya}{\sqrt{\sum_{1}^{n} (Xa)^2 \cdot \sum_{1}^{n} (Ya)^2}}$$

where
Xa=the stored table of the expected signal and
Ya=a sequence of voltage samples of the same length "n".

In the running cross-correlation technique, a calculation is made as each new voltage sample is made. Each new list of "n" samples for Ya is made by adding the newest sample at the start of the list and eliminating the oldest sample. Cross-correlation techniques for signal detection are well-known and are discussed, for example, in the text *An Introduction to the Theory of Random Signals and Noise* by W. S. Davenport, Jr., and Wilburn L. Root, McGraw Hill Book Co., 1958. While the cross-correlation technique has been found to be satisfactory, other detection techniques could obviously be implemented.

FIG. 2 is a block diagram, depicting one embodiment of the electrical control 11 of the invention. A microprocessor 21 provides the programmed control signals to the LTC control circuitry 22, which actuates the LTC transformer 23. The control signal, discussed above, causes the transformer 23 to couple the coded signal pattern, also described above, to the various receivers A, B . . . Z. Dependent on the coded pattern, the receivers A, B . . . Z will respond and turn off their respective load groups A, B . . . Z. Receivers A, B . . . Z may be of any suitable known design, and are depicted only in block form in FIG. 2 as including a coupling current transformer CT, a decoder, switch means and a timer. The loads will be turned OFF for a selected period of time, determined by the timer. In other words, a signal from LTC transformer 23 will turn off the selected load group or groups; and the timer in each receiver will cause the associated switch to turn ON the load group connected thereto after a desired time period.

As mentioned above, in another embodiment of the invention, a turn-ON signal is provided by the LTC transformer and may be utilized in conjunction with, or in lieu of, the timer.

Also, the coded signals may be used to selectively open and close circuit breakers (such as 17 of FIG. 1) so as to remove interruptable loads during a peak load or emergency condition and then reclose the breaker when conditions permit.

In another embodiment, the coded signals are used to switch power factor correction capacitors (such as 18 in FIG. 1) by opening or closing conventional load break switches, such as that labeled S in FIG. 1, which are normally associated with such capacitors.

In a modification of the invention, the coded signals may be used to raise or lower the center of the band voltage of a capacitor control device. This has the effect of selecting the capacitor for switching where the switching will have the most desirable effect on the voltage.

While the invention has been particularly shown and described with reference to preferred embodiments thereof, it will be understood by those skilled in the art that various changes in form and details may be made therein without departing from the spirit and scope of the invention.

I claim:

1. A method for utilizing a load tap changing transformer for signal communication for enabling selective control of electrical devices receiving electrical power from said transformer, consisting of the steps of:
    (a) providing a coded signal from said load tap changing transformer, comprising time-dependent stepped voltage variations;
    (b) coupling said coded signal to electrical input points of said devices; and
    (c) enabling said devices to selectively decode said coded signal and selectively respond thereto;
    (d) whereby the electrical energy coupled to energize said devices is controlled.

2. A method as in claim 1, wherein:
    (a) a first step consists of initiating a control signal; and wherein
    (b) the coded signal comprises a series of varied step voltage levels of predetermined time periods.

3. A method as in claim 1, further including the step of:
    (a) timing the energization for each of said devices from a selected reference point.

4. A method as in claim 1, further including the step of:
    (a) switching off selected devices for varied selected periods of time determined by said coded signal.

5. A method as in claim 1, further including the step of:
    (a) adjusting the power provided to each device during a selected period determined from a reference point.

6. A load tap changing transformer system for use with a power distribution system having a plurality of electrical devices connected thereto, wherein the transformer has a plurality of electrical taps for providing output power at voltages dependent on the variable tap position setting of said transformer comprising, in combination, means for enabling said transformer to provide a coded output comprising time-dependent voltage levels, means for providing a signal to cause said transformer to provide said coded output, signal-receiving and decoding means associated with said devices for enabling said devices to be selectively activated in response to a selected code, whereby the power status of selected ones of said devices may be controlled.

7. Apparatus as in claim 6, wherein said coded voltage signals from said transformer selectively turn off said devices.

8. Apparatus as in claim 6, further including timing means associated with each of said devices to turn on said devices at a predetermined time after said devices have been turned off by said transformer signal.

9. Apparatus as in claim 6, wherein said devices comprise capacitor means connected to said transmission system, said capacitor means being connectable at selected points to change the electrical phase so as to improve the power factor of an associated load, load break switches associated with capacitor means being responsive to respective receiver means for selectively coupling said capacitor means to said transmission system.

10. Apparatus as in claim 9, wherein the device is a capacitor control device and wherein the signal is utilized to change the center of the band voltage of said device whereby those capacitors will be switched which have the most desirable effect on the voltage.

11. Apparatus as in claim 6, wherein the same transmission lines are used to convey high power to the loads and also to carry the signals from said transformer to said loads.

12. Apparatus as in claim 6, wherein each receiver comprises a receiver having three input leads, said receiver sensing the system voltage continuously between two input leads while responsively switching loads between the third and one of the other two leads.

* * * * *